US012296457B1

(12) United States Patent
Richman et al.

(10) Patent No.: US 12,296,457 B1
(45) Date of Patent: May 13, 2025

(54) TOOL BIT STORAGE SYSTEM

(71) Applicant: Milwaukee Electric Tool Corporation, Brookfield, WI (US)

(72) Inventors: Zachary W. Richman, Milwaukee, WI (US); Grant T. Squiers, Cudahy, WI (US); Scott D. Eisenhardt, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/402,339

(22) Filed: Jan. 2, 2024

Related U.S. Application Data

(63) Continuation of application No. 17/516,250, filed on Nov. 1, 2021, now Pat. No. 11,897,117, which is a (Continued)

(51) Int. Cl.
*B25H 3/00* (2006.01)
*A41D 13/04* (2006.01)
*A41D 31/08* (2019.01)

(52) U.S. Cl.
CPC ............ *B25H 3/003* (2013.01); *A41D 13/04* (2013.01); *A41D 31/08* (2019.02)

(58) Field of Classification Search
CPC .......... B25H 3/003; B25H 3/00; B65D 85/20; B65D 85/08; B65D 85/24; B65D 85/26; B65D 85/28; B65D 85/14; B01L 9/06; Y10S 206/804; Y10S 206/817
USPC ........ 206/349, 379, 443, 446, 224; 220/500, 220/528, 529, 532, 533, 625, 626, 428; 224/251, 904
See application file for complete search history.

(56) References Cited

U.S. PATENT DOCUMENTS 1,860,029 A 5/1932 Held
2,883,082 A 4/1959 Schlumbohm
(Continued)

FOREIGN PATENT DOCUMENTS

CN 101505924 A 8/2009
CN 106976620 A 7/2017
(Continued)

OTHER PUBLICATIONS

International Search Report and Written Opinion for PCT/US19/46186 dated Nov. 26, 2019, 13 pages.

*Primary Examiner* — Rafael A Ortiz
*Assistant Examiner* — Sanjidul Islam
(74) *Attorney, Agent, or Firm* — Reinhart Boerner Van Deuren s.c.

(57) ABSTRACT

A drill bit cooling system is provided. After drilling use, the drill tip of a drill bit reaches higher temperatures than a shank or flute of the drill bit. Compartments are provided that are sized in length and width (diameter) to accommodate the drill bit and a cover or back plate with an increased melting temperature facilitates the storage of hot drill tip. By using different components to construct the drill bit holder, a lightweight and versatile cooling system permits the drill bit to be rapidly interchanged on a power tool or drill, without melting through the storage device. This helps the operator interchange drill bits while working on a workpiece without waiting for each drill bit to cool prior to storing and replacing the drill bit.

15 Claims, 14 Drawing Sheets

Related U.S. Application Data continuation of application No. 16/545,860, filed on Aug. 20, 2019, now Pat. No. 11,167,405, which is a continuation of application No. PCT/US2019/046186, filed on Aug. 12, 2019.

(60) Provisional application No. 62/718,178, filed on Aug. 13, 2018.

(56) References Cited

U.S. PATENT DOCUMENTS

| | | | | | |
|---|---|---|---|---|---|
| 3,033,412 | A | | 5/1962 | Fox | |
| 4,130,200 | A | | 12/1978 | Lepson et al. | |
| 4,244,542 | A | * | 1/1981 | Mathews | F16L 3/223<br>248/68.1 |
| 4,497,412 | A | | 2/1985 | Labelle | |
| 5,568,887 | A | | 10/1996 | Gollihue et al. | |
| 6,820,854 | B2 | | 11/2004 | Oetiker et al. | |
| 8,777,005 | B2 | | 7/2014 | Lai | |
| 9,050,737 | B1 | | 6/2015 | McDaniel | |
| 2008/0142669 | A1 | | 6/2008 | Zlotocha | |
| 2016/0263740 | A1 | | 9/2016 | Sackfield | |

FOREIGN PATENT DOCUMENTS

| | | | |
|---|---|---|---|
| EP | 1785234 | A2 | 5/2007 |
| JP | 01-037913 | Y2 | 11/1989 |
| JP | H07237662 | A | 9/1995 |
| JP | 2000191022 | | 7/2000 |

* cited by examiner

TOOL BIT STORAGE SYSTEM

CROSS-REFERENCE TO RELATED PATENT APPLICATIONS

The present application is a continuation of U.S. application Ser. No. 17/516,250, filed Nov. 1, 2021, which is a continuation of U.S. application Ser. No. 16/545,860, filed Aug. 20, 2019, now U.S. Pat. No. 11,167,405, which is a continuation of International Application No. PCT/US2019/046186, filed on Aug. 12, 2019, which claims the benefit of and priority to U.S. Provisional Application No. 62/718,178, filed on Aug. 13, 2018, which are incorporated herein by reference in their entireties.

BACKGROUND OF THE INVENTION

The present invention relates generally to the field of organizing and storing drill bits. The present invention relates specifically to a bit holder storage system for storing a tool bit at an elevated temperature resulting from use of the tool bit.

SUMMARY OF THE INVENTION

One embodiment of the invention relates to a cooling bit holder storage system. The system includes a first compartment a second compartment and a cover plate. First compartment extends along a longitudinal first compartment axis and includes a first opening, a first end located opposite first opening along first compartment axis, and a first material having a first melting temperature. Second compartment extends along a second compartment longitudinal axis that is parallel to first compartment longitudinal axis. Second compartment including a second opening with a second end opposite second opening along second compartment axis and a second material having a second melting temperature. Cover plate couples to both first and second ends of first and second compartments in a direction perpendicular to first and second compartment axes. Cover plate includes a third material with a third melting temperature that is higher than first and second melting temperatures of first and second compartments.

Another embodiment of the invention relates to a storage bit holder for cooling drill bits. The storage bit holder includes a first compartment, a second compartment and a cover plate. First compartment includes a first material that extends along a first longitudinal axis, a first opening opposite a first end, and a first radius orthogonal to first longitudinal axis. Second compartment includes a second material that extends along a second longitudinal axis, a second opening opposite a second end, and a second radius orthogonal to second longitudinal axis. First radius is less than second radius to accommodate drill bits of different sizes. Cover plate has a third material that is different from first material and second material. Cover plate is coupled to a bore between first compartment and second compartment. The bore is perpendicular to first and second longitudinal axes. Cover plate extends over first end of first compartment and second end of second compartment.

Another embodiment of the invention relates to a cooling system for a drill bit. The system includes a drill bit, a first compartment, a second compartment, and a cover plate. The drill bit has an elevated temperature at a drilling tip of the drill bit that is greater than a temperature of a shank of the drill bit. The first compartment has a first material with a first melting temperature extending along a first longitudinal axis, a first opening opposite a first end, and a first radius orthogonal to first axis. The second compartment has a second material with a second melting temperature extending along a second longitudinal axis parallel to first axis, a second opening opposite a second end, and a second radius orthogonal to second axis. Cover plate has a third material with a third melting temperature. The temperature of the drilling tip of the drill bit is higher than first melting temperature of first compartment and higher than second melting temperature of second compartment and is less than the third melting temperature of cover plate.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a cooling bit holder storage system, cooling system for a drill bit, storage bit holder, and/or bit holder are shown. After use, the drill bit tip and/or cutting end becomes hot from the friction generated between the drill bit and the workpiece. When an operator switches the hot drill bit for another drill bit, for example to drill a different sized hole, the operator stores the hot drill bit. The operator generally does not wait for the drill bit to cool, and instead stores the hot drill bit, for example, in a pocket of an apron. This results in melting, singeing, burning, etc. of the pockets of the apron. Applicant has found that by including a drill bit holder, designed as discussed herein, within the pockets of the apron, the chance of so damaging the pocket while storing a hot drill bit is reduced. Specifically, the bit holder can prevent melting by including materials with an elevated melting temperatures.

In some embodiments, a bit holder includes two or more compartments configured to store different sized drill bits. The compartments are coupled together and configured to fit in the pocket of an apron or other tool carrying device. The bottom of the compartments includes a material with a melting point that is greater than the melting point of either compartment and/or the apron. In other words, the cover is made from a material configured to resist melting from hot used drill bits.

Figure 1:
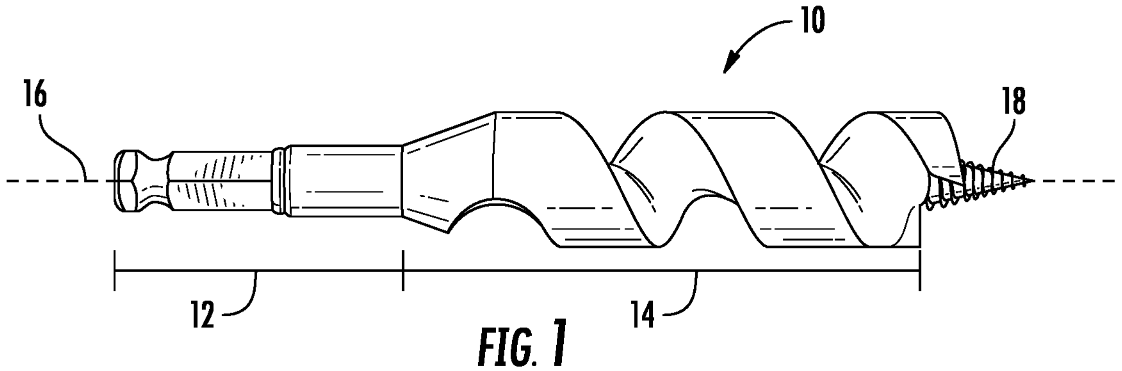
FIG. 1 is side view of a tool bit for use with a drill, according to an exemplary embodiment.

FIG. 1 illustrates an auger tool or drill bit 10 for use with a drill or other power tool. Drill bit 10 includes an elongated drill shank 12 coupled to a drill flute 14 that both extend along a drill axis 16 of drill bit 10. A cutting blade, chisel edge, flank, or drill tip 18 extends along the drill axis 16 at a cutting end of drill bit 10, and is configured to frictionally interface with a workpiece, e.g., to drill a hole in the workpiece.

Figure 2:
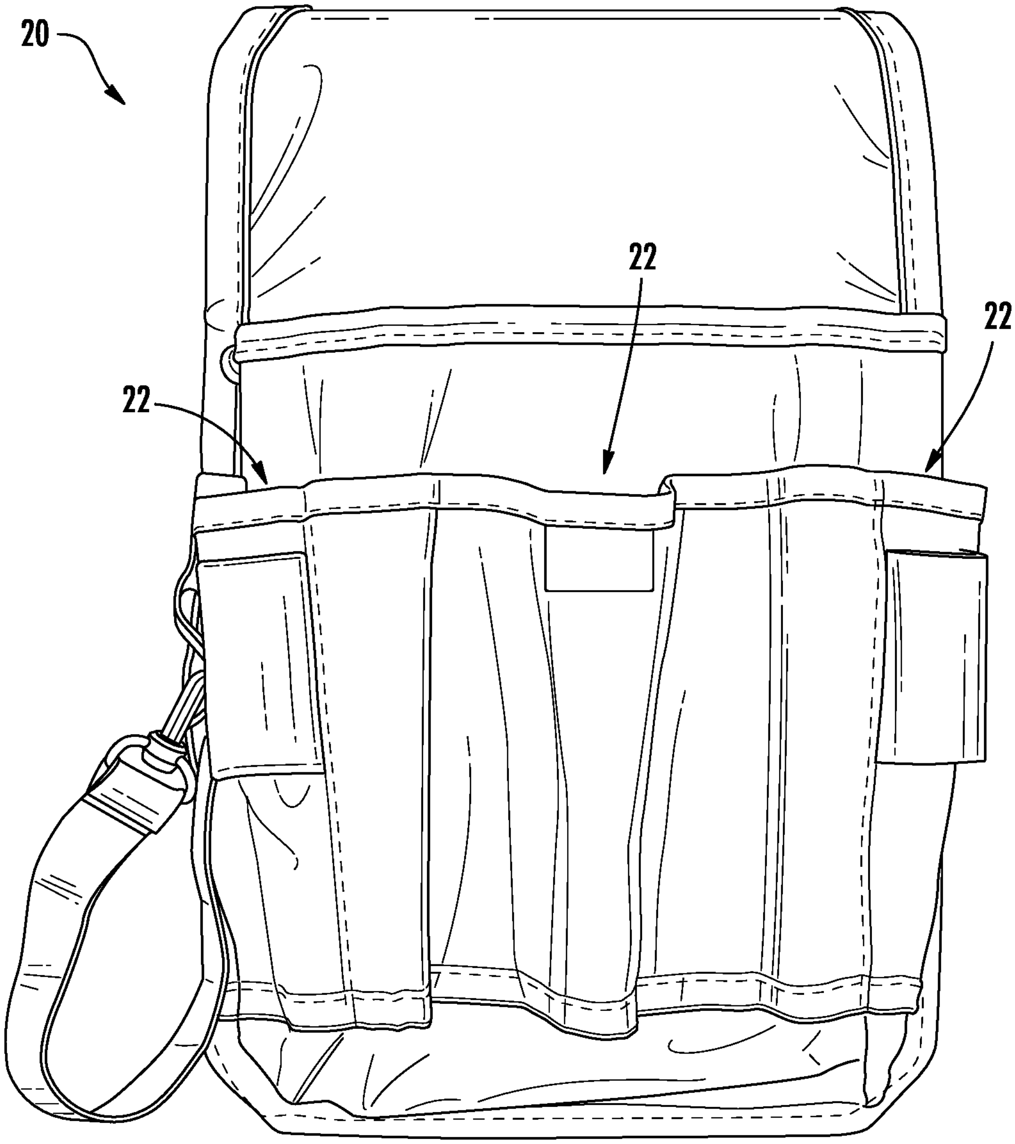
FIG. 2 is a front view of a tool pouch, according to an exemplary embodiment.

As shown in FIG. 2, a tool pouch, transporting device, or apron 20 includes a plurality of pockets 22. A user places drill bits 10 and/or the power tool (e.g., drill) within one of the pockets 22 for storage while drill bit 10 or power tool is not in use. In some embodiments, pockets 22 include a bit holder 24 (FIG. 3) to store drill bits 10 after use. For example, the drill tip 18 of a used drill bit 10 has an elevated temperature compared to the drill shank 12 and/or flute 14. Use of bit holder 24 in pockets 22 of apron 20 prevents the hot drill tip 18 from melting pockets 22 of apron 20. In other embodiments, bit holder 24 stores drill bits 10 independent of apron 20, such that bit holder 24 serves as an independent way to store used drill bits 10.

Figure 3:
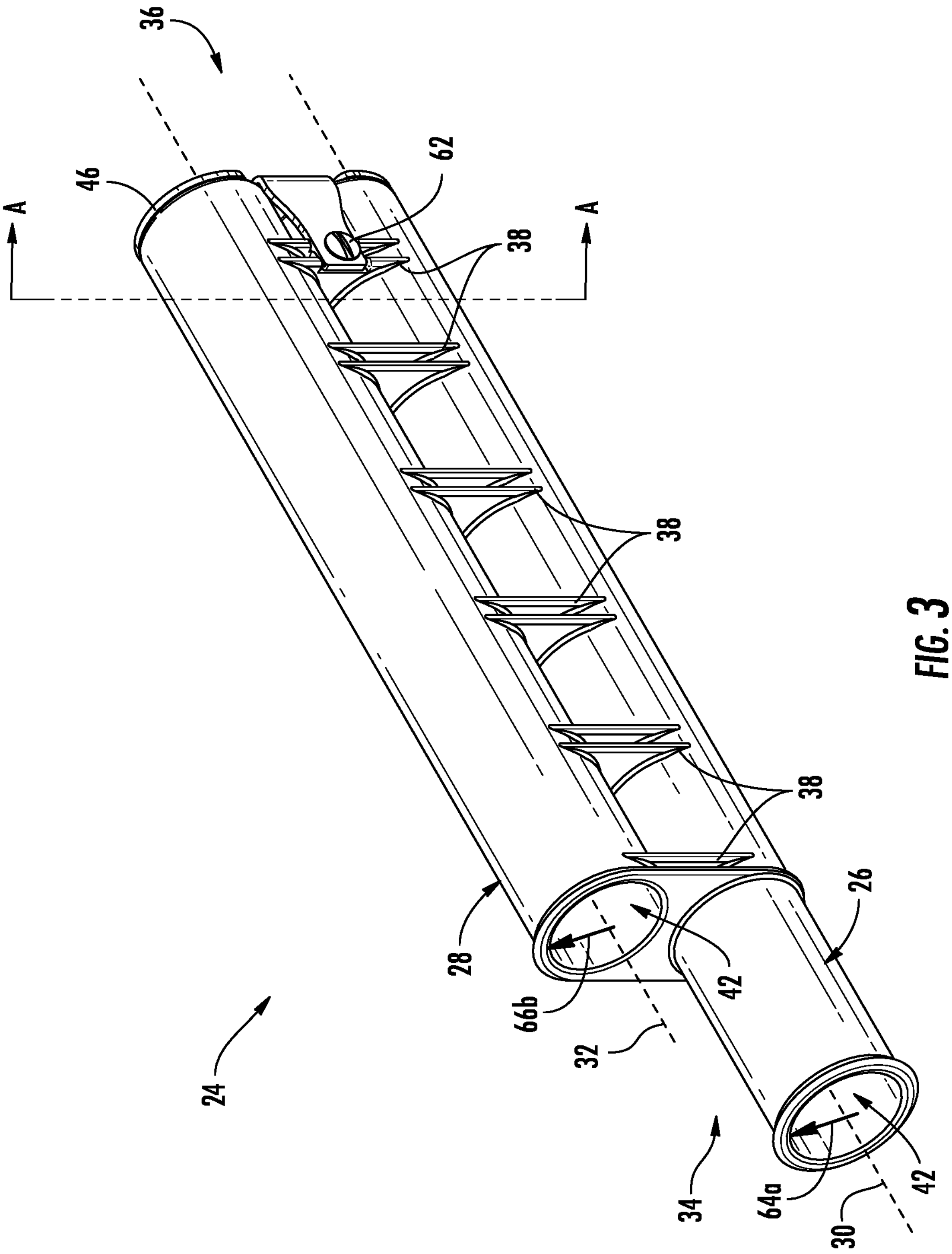
FIG. 3 is a perspective view of a bit holder, according to an exemplary embodiment.

FIG. 3 shows bit holder 24 with a first extended or long compartment 26 and a second condensed or short compartment 28. Long compartment 26 extends along a first or long compartment axis 30 and short compartment 28 extends along a second or short compartment axis 32. Long compartment axis 30 and short compartment axis 32 are parallel to one another and range between a first separated or detached end 34 and a second contiguous or adjacent end 36. In the illustrated embodiment, long compartment 26 has a different length than short compartment 28, for example the long length is greater than the short length. Long and short compartments 26 and 28 are substantially flush or co-planar at adjacent end 36. In this embodiment, long compartment 26 extends further along long compartment axis 30 than short compartment 28 extends along short axis 32 at detached end 34. In the illustrated embodiment, long and short compartments 26 and 28 are both cylindrical bodies. In other embodiments, one or both of long compartment 26 and/or short compartment 28 may have a different shape.

In some embodiments, long and short compartments 26 and 28 are formed together as a single unitary single piece. In this configuration, connectors 38 support the joints between compartments 26 and 28. In some embodiments, long and short compartments 26 and 28 are different pieces and/or materials that are coupled together with connectors 38. Connectors 38 couple and/or support long compartment 26 to short compartment 28. In the embodiment of FIG. 3, the connector 38 proximate to adjacent end 36 includes a bore 40 (FIG. 5) that extends across and/or between long and short compartments 26 and 28. Bore 40 extends in a direction orthogonal with respect to long and short compartment axes 30 and 32.

Long and short compartments 26 and 28 are each hollow and include a first or exposed opening 42 at detached end 34 and a second or sealed opening 44 (FIG. 5) at adjacent end 36. In this way, when drill bit 10 is placed in one of the exposed openings 42 at detached end 34 and the corresponding sealed opening 44 prevents drill bit 10 from falling through adjacent end 36. A bottom cover plate or cover 46 is received and coupled to sealed openings 44. Cover 46 uses different materials than long and short compartments 26 and 28. Thus, cover 46 uses a material with a different melting temperature that protects bit holder 24 from melting when a used drill tip 18 is stored at sealed opening 44. For example, long and short compartments 26 and 28 are made from either the same material or a different material with corresponding melting temperatures (e.g., a first and/or second material with a first and/or second melting temperature). Cover 46 on sealed openings 44 at adjacent end 36 is located on a side opposite exposed openings 44 configured to receive drill bit 10.

Figure 4:
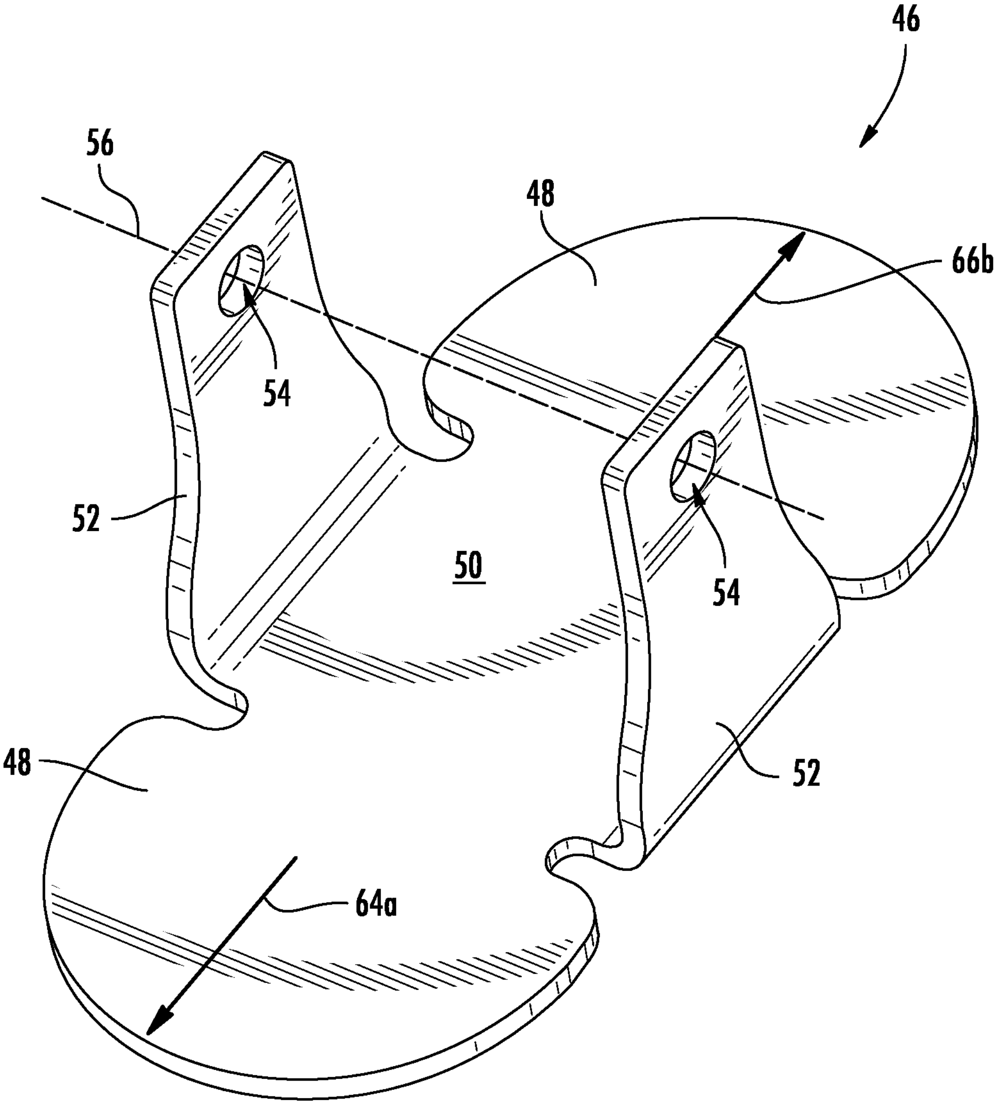
FIG. 4 is a perspective view of a cover of the bit holder of FIG. 3, according to an exemplary embodiment.

For example, cover 46 is disposed at adjacent end 36 and seals openings 44. As shown in FIG. 4, cover 46 includes two generally semi-circular side portions 48 and a generally rectangular middle portion 50 between the two side portions 48. Side portions 48 and middle portion 50 are configured to generally match the cross-section of openings 44 at adjacent end 36 of bit holder 24 (FIG. 3). In some embodiments, drill tip 18 rests direction on cover 46. In some embodiments, cover 46 includes an insert 330 (FIGS. 5, 10, and 11) that couples to cover 46 to receive a hot drill tip 18. For example, insert 330 protects cover 46 and/or an internal wall 51 of compartments 26 and 28. Cover 46 extends perpendicularly to compartment axes 30 and 32 and has a third cover 46 material with a third cover 46 melting temperature. The melting temperature of cover 46 material is different than the melting temperature of compartment 26 and/or 28 material(s). For example, cover 46 material has a melting temperature that is higher than the material of compartment 26 and/or 28. In some embodiments, insert 330 couples to cover, such that the melting temperature of cover 46 is equal to or less than the melting temperatures of compartment 26 and/or 28. In this configuration, insert 330 has a melting temperature that is greater than the temperature of drill tip 18 and protects cover 46 and compartments 26 and 28.

In some embodiments, two or more bent protrusions 52 extend from opposite sides of cover 46 (e.g., from middle portion 50). In FIG. 4, bent protrusions 52 are spaced apart from the two side portions 48 and are generally orthogonal with respect to middle portion 50. For example, bent protrusions 52 extend in a direction generally parallel to compartment axes 30 and 32 when cover 46 is coupled to compartments 26 and 28 (e.g., at bore 40). Each bent protrusion 52 includes a hole 54 positioned proximate to a terminal end of the bent protrusion 52. Holes 54 through bent protrusions 52 are aligned along a hole axis 56 orthogonal to compartment axes 30 and 32 when cover 46 is located on adjacent end 36 of bit holder 24. For example, as shown in FIGS. 3 and 5, cover 46 couples to a connector 38 with a fitting or bolt 58 that passes between holes 54 and bore 40 through hole axis 56 positioned between compartments 26 and 28.

Figure 5:
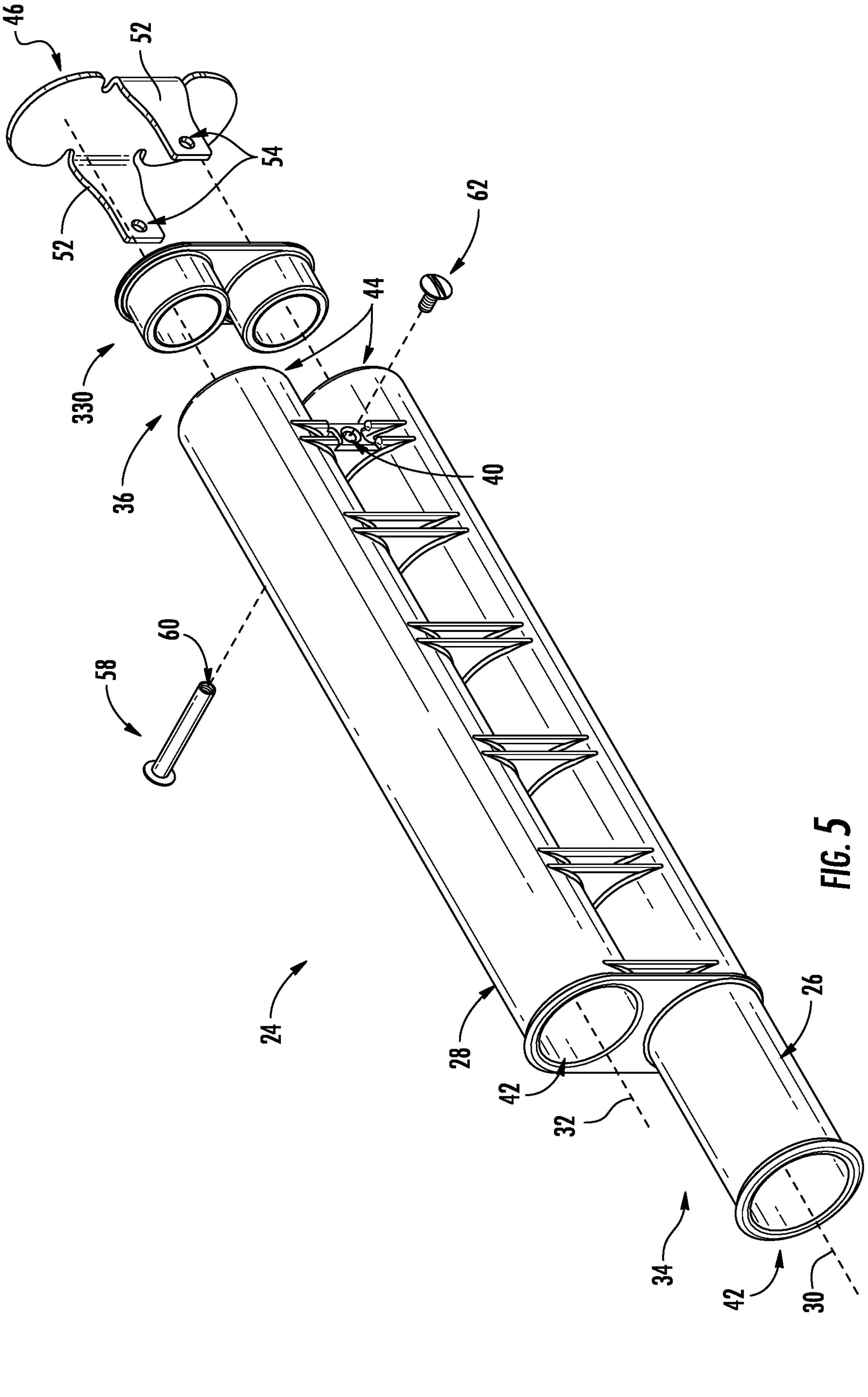
FIG. 5 is an exploded view of the bit holder of FIG. 3, according to an exemplary embodiment.

As shown in FIG. 5, cover 46 is positioned proximate adjacent end 36 so that each side portion 48 is aligned with the openings 44. Cover 46 is attached to bit holder 24 using bolt 58 with a hollow passageway 60 to receive a screw 62. Bolt 58 extends through holes 54 and bore 40 along hole axis 56 to secure and seal cover 46 against adjacent end 36 of bit holder 24.

Drill bit 10 and drill bit holder 24 have a generally cylindrical shape. A diameter of compartment 26 is greater than or equal to a diameter of compartment 28. Generally a diameter of drill bit 10 is smaller than a diameter of one of compartments 26 and/or 28, which allows drill bit 10 to be received/stored within at least one of compartments 26 and/or 28. Similarly, different lengths of long and short compartments 26 and 28 enables different sized drill bits 10 to be conveniently stored in different compartments 26 and/or 28 of the same bit holder 24. For example, longer drill bits 10 (e.g., with a larger diameter) are stored in long compartment 26 and shorter drill bits 10 (e.g., with a smaller diameter) are stored in short compartment 28.

For example, a first length extending from opening 44 of short compartment 28 to adjacent end 36 of short compartment 28 is less than a second length extending from opening 44 of long compartment 26 to adjacent end 36 of long compartment 26, such that the second length is greater than the first length.

With reference to FIGS. 3 and 4, compartments 26 and 28 are hollow cylinders and cover 46 extends perpendicular to a center on compartment axes 30 and 32 in a radial direction. A radius 64*a* extends from a semi-circular side portion 48 of cover 46 and matches a radius 66*a* of the cylindrical long compartment 26 at adjacent end 36 extending from compartment axis 30 to an internal wall 51 of compartment 26. Similarly, a radius 64*b* extends from a semi-circular side portion 48 of cover 46 and matches a radius 66*b* of cylindrical compartment 28 that extends from compartment axis 32 to an internal wall of compartment 28 at adjacent end 36. In some embodiments, radius 64*a* and 66*a* is greater than or equal to radius 64*b* and 66*b*. In this way, compartment 28 with smaller radius 66*b* is configured to accommodate a smaller diameter drill bit than compartment 26 with larger radius 66*a* that is configured to accommodate a larger diameter drill bit.

In some embodiments, compartments 26 and 28 are constructed from a polymer plastic material, which may melt after repeated contact with the hot drill bit 10. Cover 46 is made from a metal or composite material with a melting point greater than the polymer plastic material (e.g., greater than the temperature of a used drill tip 18). When drill bit 10 is inserted into the bit holder 24 after use, tip 18 of drill bit 10 contacts cover 46. The material of cover 46 has a melting temperature that prevents drill bit 10 from melting a hole through cover 46 or bit holder 24. In some embodiments, drill tip 18 directly contacts cover 46.

In some embodiments, cover 46 couples to an insert 330 (described below in FIG. 10) that extends into compartments 26 and 28. Cover 46 seals openings 44 at adjacent end 36 and insert 330 extends inside internal walls 51 of compartments 26 and 28. Insert 330 has a fourth or insert material with a fourth or insert melting temperature that is different from the melting temperatures of cover 46 and/or compartments 26 and 28. For example, insert 330 has a higher melting temperature than the melting temperature of cover 46. Insert 330 has a higher melting temperature than the melting temperature for either compartment 26 or 28. Insert 330 thermally insulates ends 36 and/or inner walls 51 (e.g., the internal sides) of compartments 26 and 28.

Figure 6:
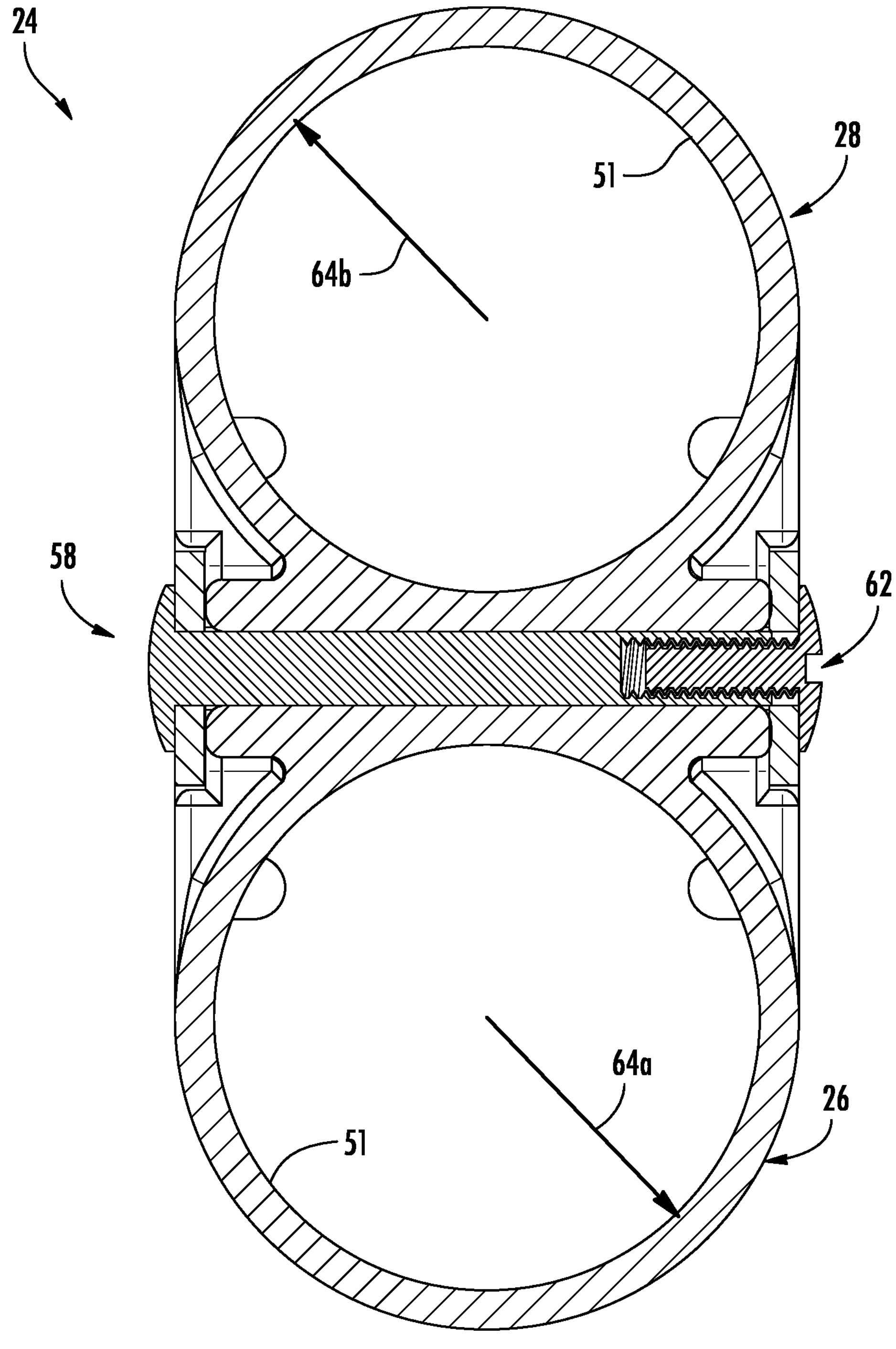
FIG. 6 is a cross-sectional view of the bit holder of FIG. 3, viewed along line A-A, according to an exemplary embodiment.

FIG. 6 shows a cross section of bit holder 24 as shown in FIG. 3 taken at line A-A. As shown in this cross section of bit holder 24, compartments 26 and 28 are coupled as a single unitary piece and have the same material properties (e.g., same melting temperature). The internal radius 64*a* of long compartment 26 may be the same or greater than the internal radius 64*b* of short compartment 28. In some embodiments, compartments 26 and 28 are constructed from a lightweight polymer to reduce the weight of bit holder 24. Bolt 58 extends through bore 40 (FIG. 5) and screw 62 fits within the hollow passageway 60 (FIG. 5) of bolt 58.

Figure 7:
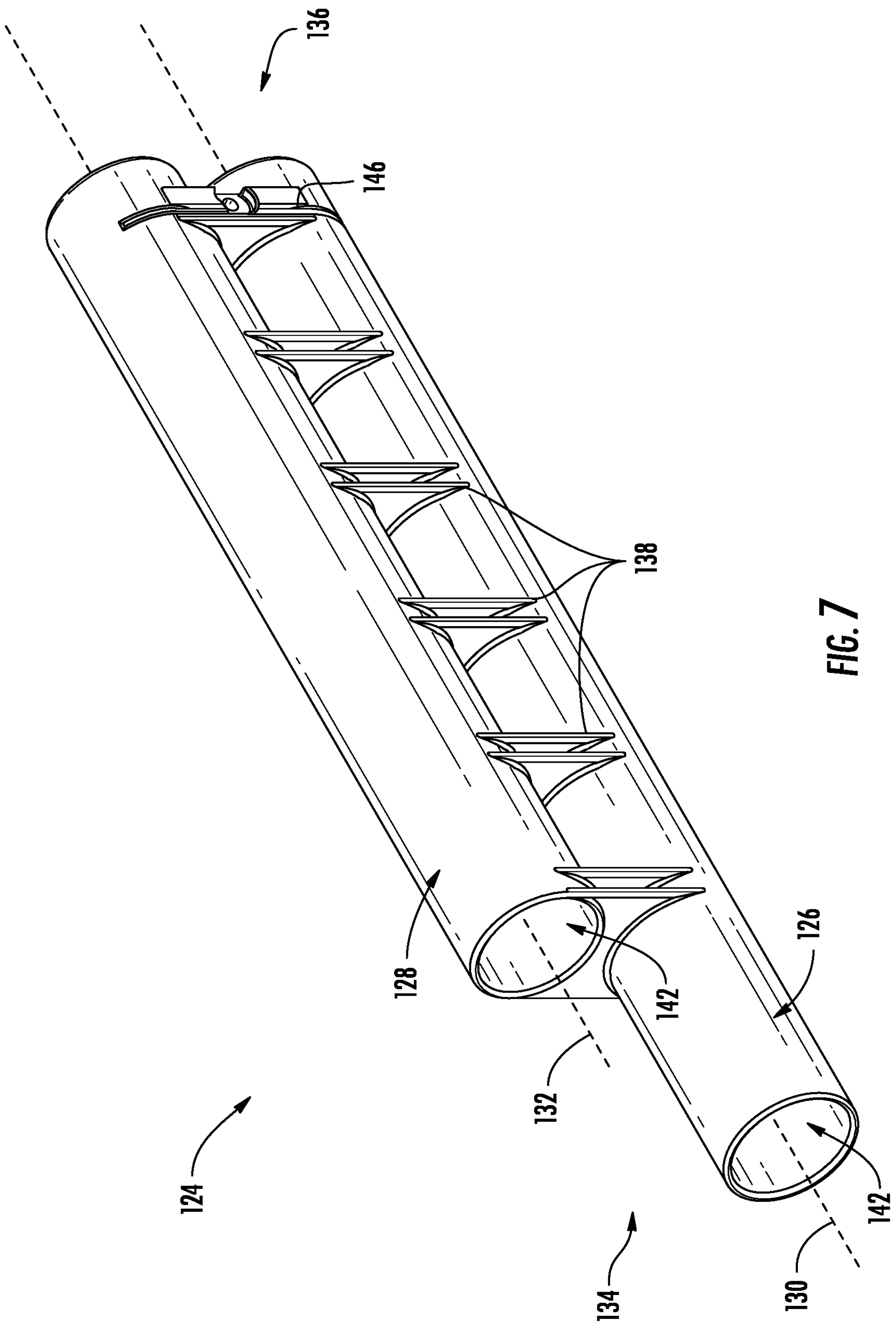
FIG. 7 is a perspective view of a bit holder according to another embodiment.
Figure 8:
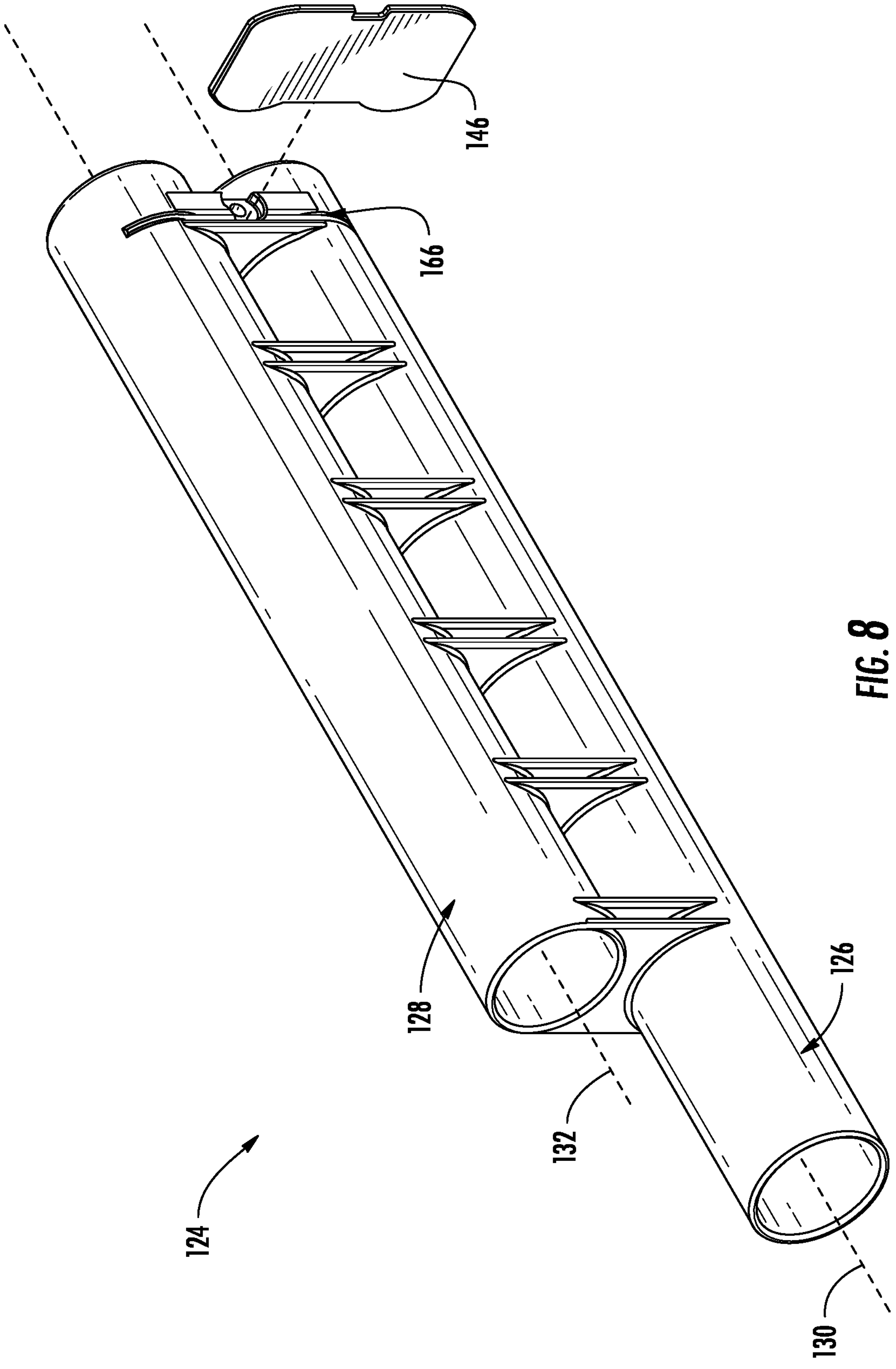
FIG. 8 is an exploded view of the bit holder of FIG. 7, according to an exemplary embodiment.

FIGS. 7 and 8 illustrate another embodiment of a bit holder 124. The embodiment of bit holder 124 is substantially the same as or similar to bit holder 24 described above, except for the differences described. In contrast to the design of bit holder 24, the design of bit holder 124 uses a cover 146 that is inserted into a slot 166 proximate to the adjacent end 136. Similar features include the same reference numbers at bit holder 24 incremented by 100.

Slot 166 (FIG. 8) extends orthogonally with respect to compartment axes 130 and 132. In some embodiments, slot 166 extends through long and short compartments 126 and 128 in a direction perpendicular to compartment axes 130 and 132. Cover 146 slidably fits within slot 166, so that cover 146 extends across both compartments 126 and 128. Slot 166 is proximal to adjacent end 136 and cover 146 is a flat material that extends through slot 166. When a user inserts drill bit 10 into opening 142 of either compartment 126 or 128, drill tip 18 rests on the inserted cover 146. In the illustrated embodiment, cover 146 is made from a metallic or composite material with a melting point that is greater than either the temperature of a used drill tip 18 or the melting temperature(s) of compartment 126 or 128. The material of cover 146 prevents drill bit 10 from melting a hole through bit holder 124 or cover 146.

The embodiment of FIGS. 9-12 illustrate another embodiment of a bit holder 224 that is similar to bit holder 24 and/or bit holder 124. The embodiment of bit holder 224 is substantially the same or similar to bit holders 24 and 124 except for the differences described. In contrast to the design of bit holders 24 and 124, bit holder 224 includes a bracket cover or end cap 246 that extends around adjacent end 236 of compartments 226 and 228. Similar features of bit holder 224 include the same reference numbers of bit holder 24 incremented by 200.

Figure 9:
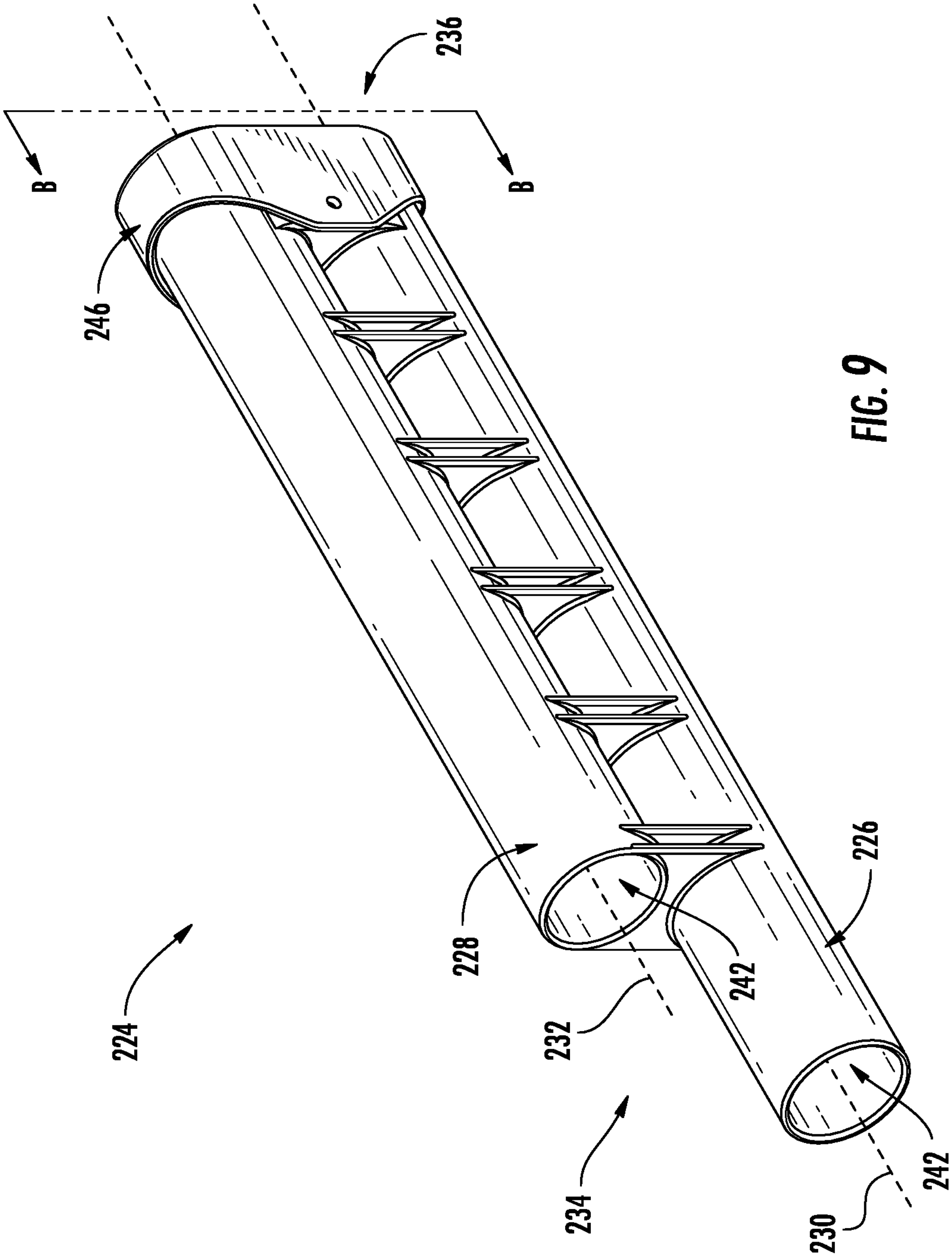
FIG. 9 is a perspective view of a bit holder according to yet another embodiment.
Figure 10:
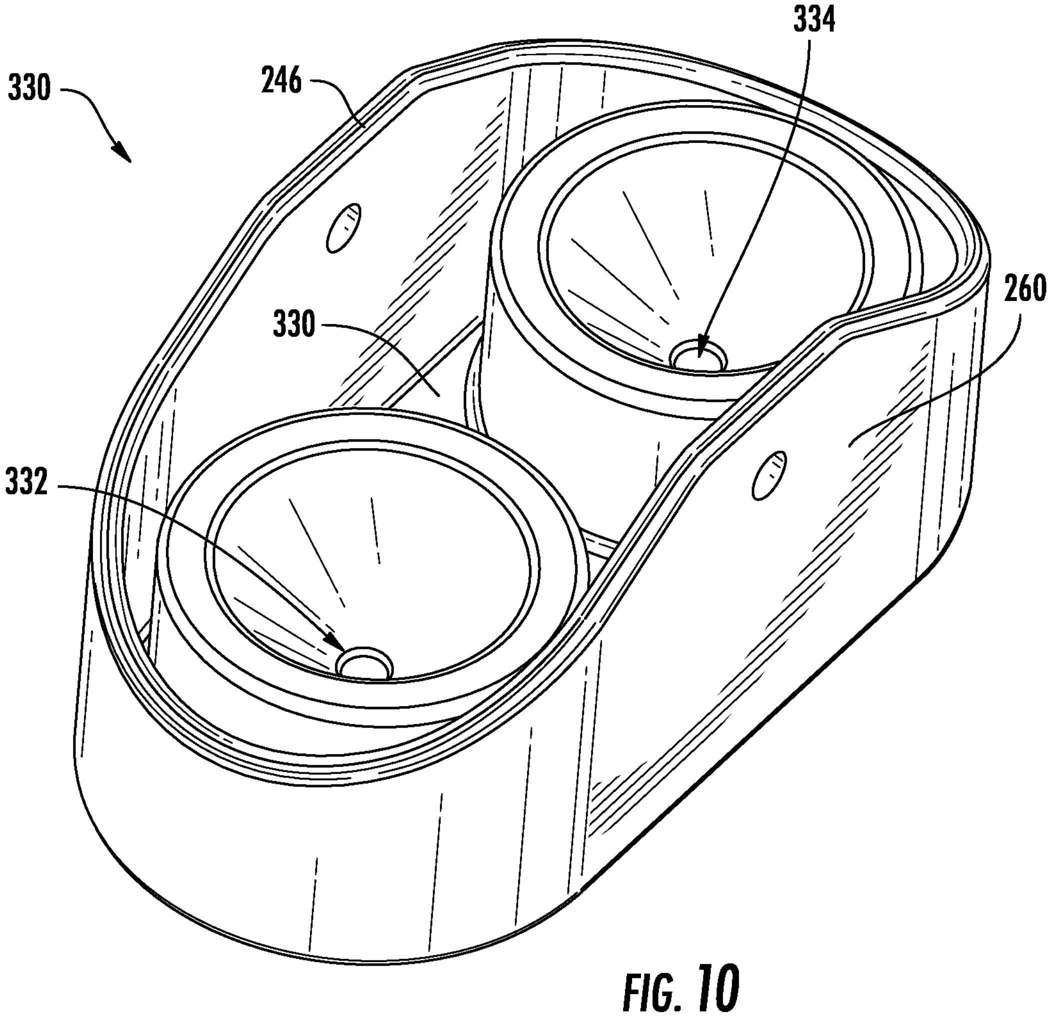
FIG. 10 is a perspective view of an end cap of the bit holder of FIG. 9, according to an exemplary embodiment.
Figure 11:
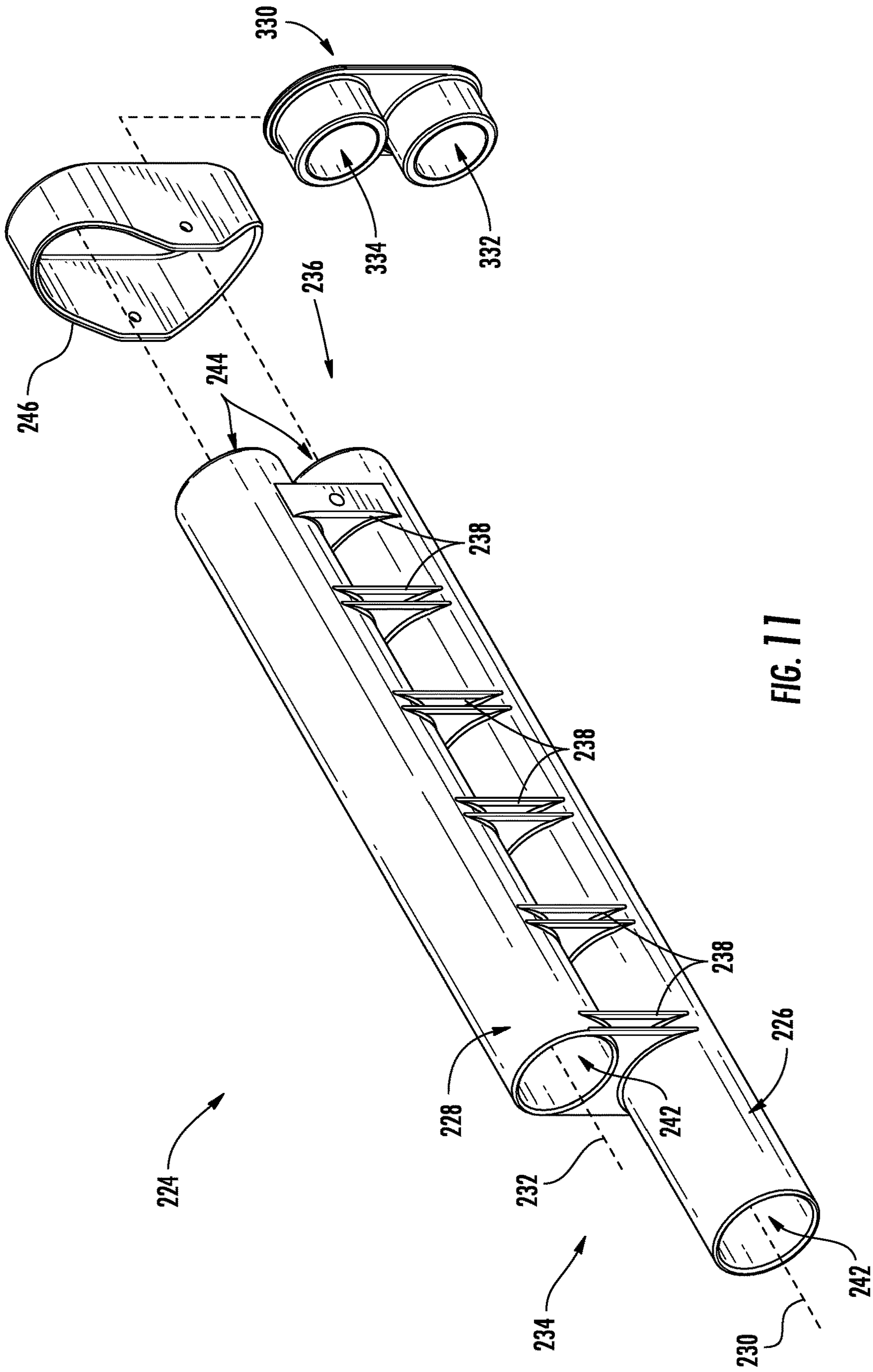
FIG. 11 is an exploded view of the bit holder of FIG. 9, according to an exemplary embodiment.

As shown in FIGS. 10 and 11, end cap 246 includes an outer portion 260 and insert 330. Dimensions of insert 330 are less than dimensions of the outer portion 260, which allows insert 330 to fit within outer portion 260. Outer portion 260 has a substantially elliptical shape, and allows outer portion 260 to fit around compartments 226 and 228 of bit holder 224 (FIG. 9).

In some embodiments, insert 330 includes a first insert receptacle 332 and a second insert receptacle 334. Insert receptacles 332 and 334 are formed from the same piece of material and are spaced apart from one another. When end cap 246 is attached to bit holder 224, first receptacle 332 is aligned with elongated compartment axis 230 and second receptacle 334 is aligned with short compartment axis 232. In some embodiments, insert 330 is modified to fit the configuration of adjacent end 136, such that each compartment 126 and/or 128 is sealed.

Figure 12:
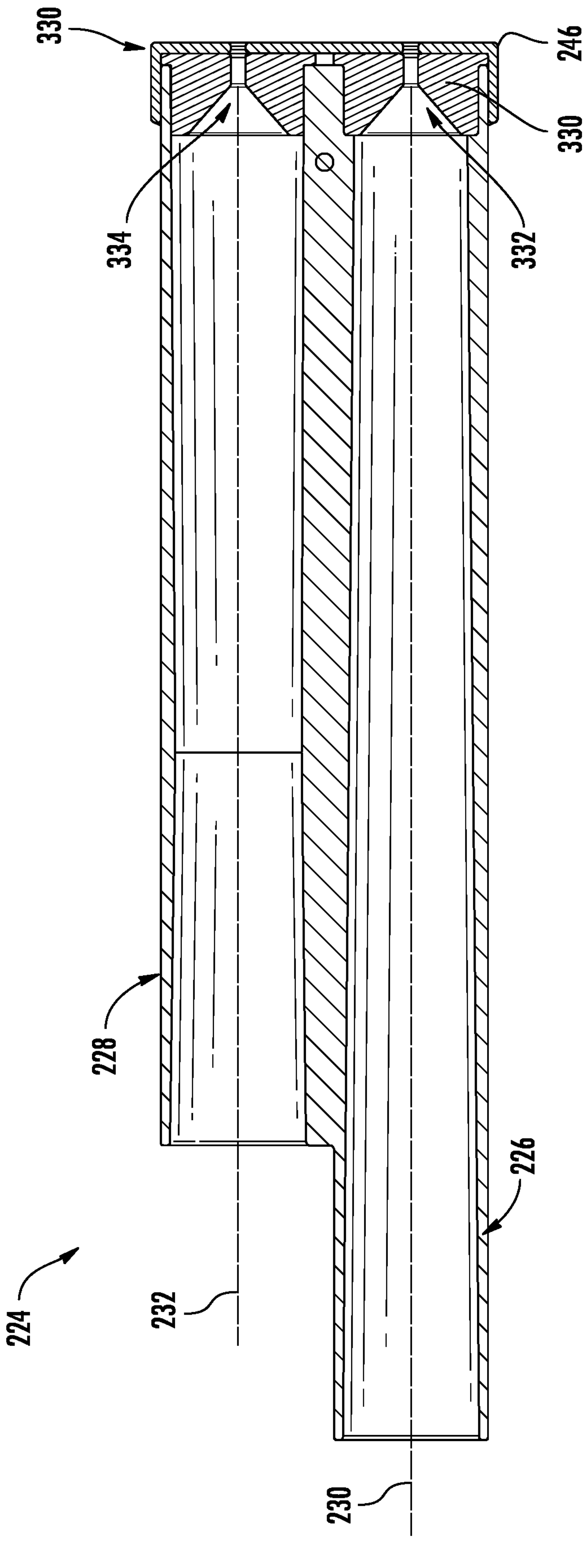
FIG. 12 is a cross-sectional view of the bit holder of FIG. 9, viewed along line B-B, according to an exemplary embodiment.

As shown in FIG. 12, first receptacle 332 and second receptacle 334 have a generally conical shape configured to align with inner wall 51 of compartments 226 and 228. In other embodiments, first receptacle 332 and/or second receptacle 334 have another shape that is configured to align with the inner walls of bit holder 224.

A user attaches end cap 246 with insert 330 into bit holder 224 to cover adjacent openings 244. A user may then insert a drill bit 10 into either compartment 226 or 228 so that a tip 18 of drill bit 10 rests within the respective insert receptacle 332 or 334 associated with that compartment 226 or 228, based on the size (e.g., diameter and length) of drill bit 10.

In the illustrated embodiment, insert 330 is made a rubber, metal, or composite material with a melting point greater than the temperature of used drill tip 18. The material of insert 330 prevents drill tip 18 from melting a hole through end cap 246. Similarly, insert 330 has a melting temperature that is greater than the melting temperature of compartments 226 and/or end cap 246.

Figure 13:
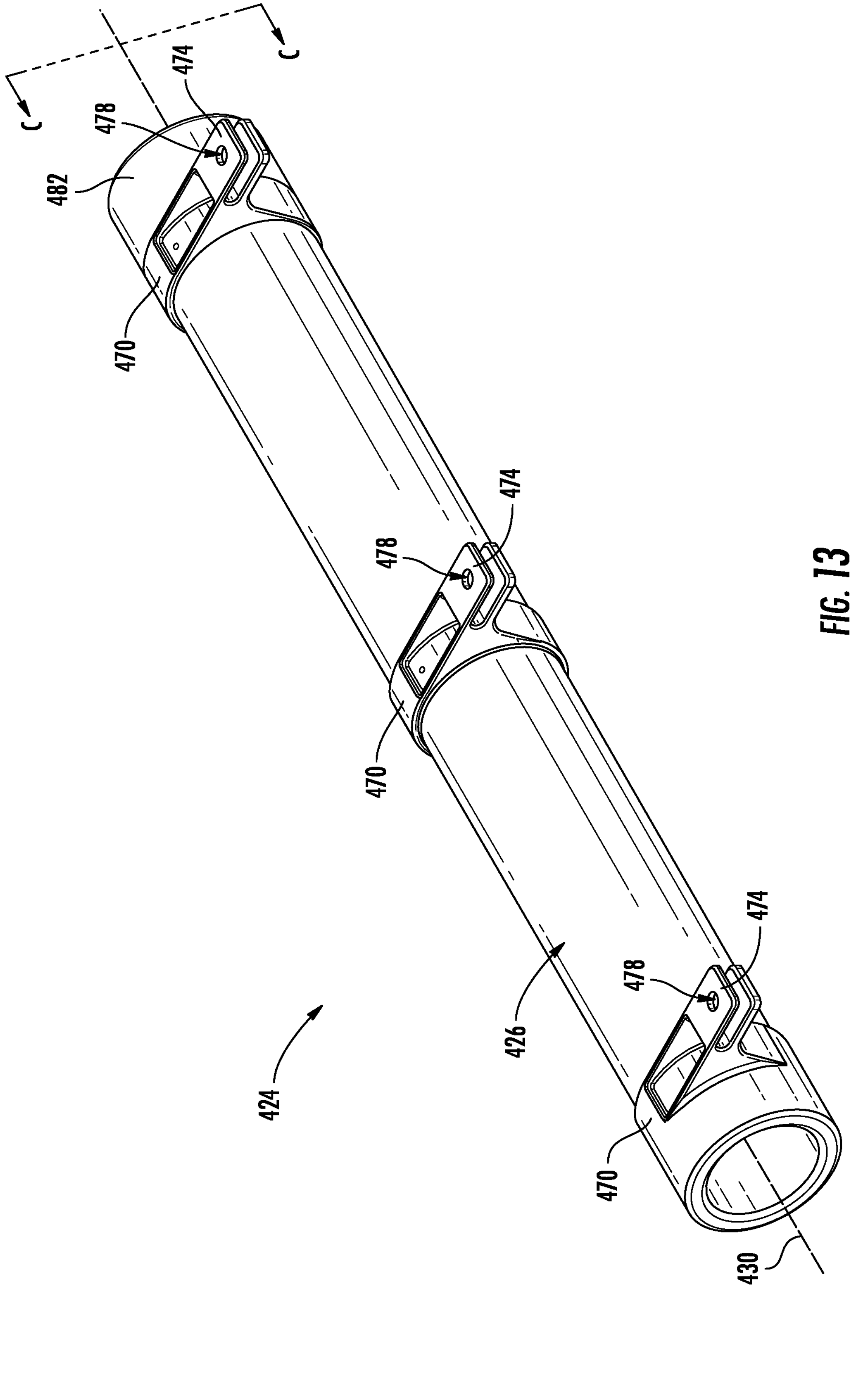
FIG. 13 is a perspective view of a bit holder according to yet another embodiment.
Figure 14:
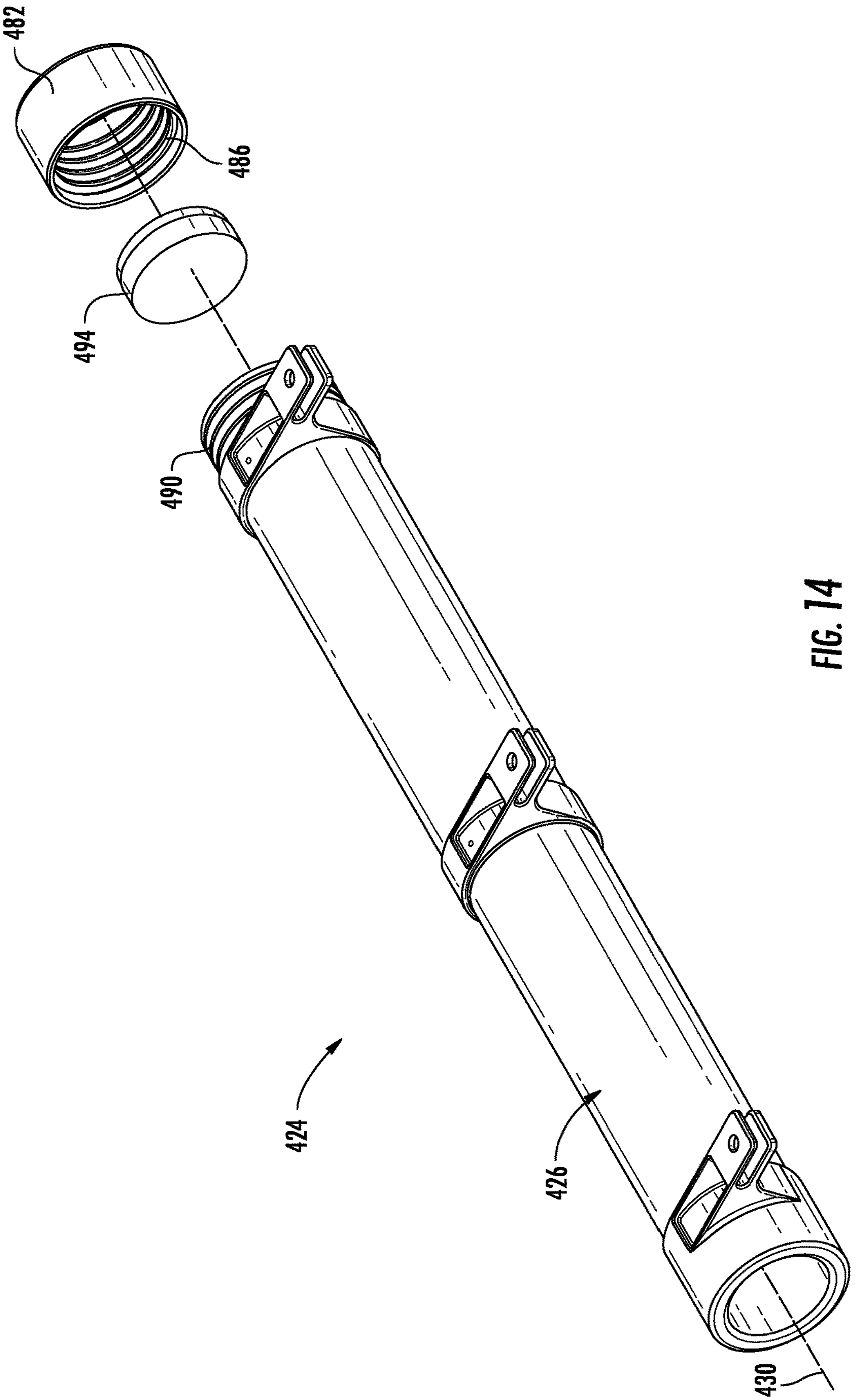
FIG. 14 is an exploded view of the bit holder of FIG. 13.
Figure 15:
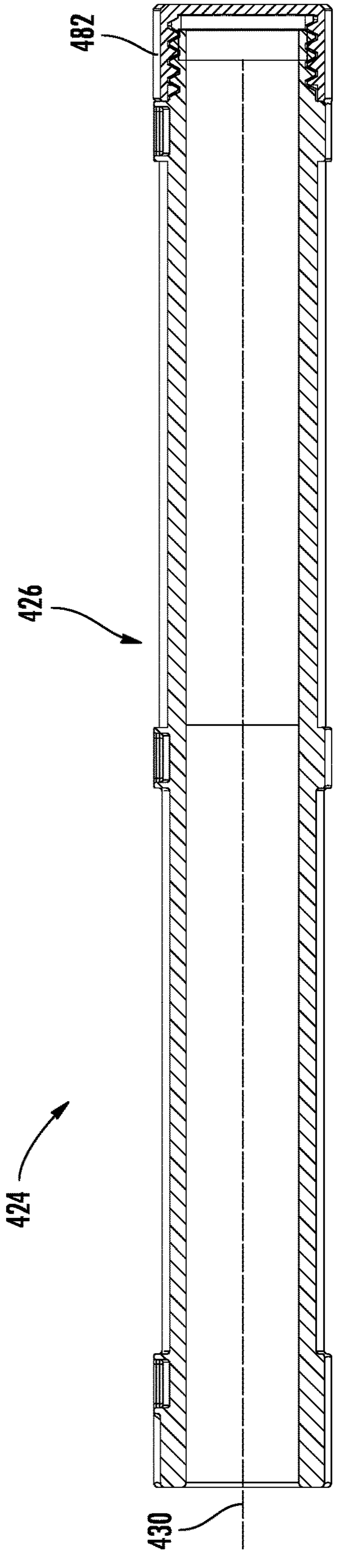
FIG. 15 is a cross-sectional view of the bit holder of FIG. 13, view along line C-C.

FIGS. 13-15 illustrate another embodiment of a bit holder 424 that is similar to bit holders 24, 124, and/or 224. The embodiment of bit holder 424 is substantially the same or similar to bit holders 24, 124, and/or 224, except for the differences described. In contrast to the design of bit holders 24, 124, and/or 224, bit holder 424 includes rings 470 and flat attachment surfaces 474. In some embodiments, bit holder 424 has one compartment 426. In other embodiments, bit holder 424 has two or more compartments 426 and 428, as described with reference to bit holders 24, 124, and/or 224. Similar features of bit holder 424 include the same reference number of bit holder 24 incremented by 400.

As shown in FIG. 13, bit holder 424 includes only a first compartment 426. In some embodiments, rings 470 are integrally formed with compartment 426. In some embodiments, rings 470 are a separate piece that couple to compartment 426. Rings 470 include flat attachment surfaces 474 that protrude beyond compartment 426 and provide a substantially flat surface 474 for bit holder 424 to rest on. Flat attachment surfaces 474 include holes 478 to receive fasteners and secure bit holder 424 to a flat surface.

As shown in FIGS. 14 and 15, a cover or end cap 482 attaches to compartment 426. End cap 482 includes a threaded portion 486 that mates with a threaded portion 490 of compartment 426 to seal opening 444. Insert 494 is disposed within end cap 482 and includes a substantially similar diameter as a diameter of compartment 426. A user may position a drill bit 10 into compartment 426 so that a tip 18 of drill bit 10 rests on insert 494. In some embodiments, insert 494 includes a metal or composite material with a melting point or temperature that is greater than used drill tip 18 and/or compartment 426. The material of insert 494 prevents drill bit 10 from melting a hole through end cap 482. Rings 470 couple to at least one of compartment 426 (and/or 428) and protrude to define flat attachment surface 474.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A tool pouch comprising:

an apron comprising a plurality of pockets; and a bit holder placed within a first pocket of the plurality of pockets, the bit holder comprising a first compartment longitudinally extending along a first axis, the first compartment comprising:

a first opening;

a first end located opposite the first opening along the first axis; and a first material having a first melting temperature;

the bit holder further comprising a second compartment longitudinally extending along a second axis parallel to the first axis, the second compartment comprising:

a second opening;

a second end opposite the second opening on the second axis; and a second material having a second melting temperature; and a cover plate coupled to both the first and second ends, the cover plate comprising a third material having a third melting temperature that is higher than the first melting temperature and the second melting temperature.

2. The tool pouch of claim 1, wherein the first melting temperature is the same as the second melting temperature.

3. The tool pouch of claim 1, wherein the first material is the same as the second material.

4. The tool pouch of claim 1, the first compartment extending a first length from the first opening to the first end, and the second compartment extending a second length from the second opening to the second end, wherein the second length is greater than the first length.

5. The tool pouch of claim 1, wherein the first compartment comprises a hollow cylinder defining a first radius extending perpendicularly from the first axis to an internal wall of the first compartment, and wherein the second compartment comprises a hollow cylinder defining a second radius extending perpendicularly from the second axis to an internal wall of the second compartment, wherein the second radius is greater than the first radius.

6. The tool pouch of claim 1, the bit holder further comprising a plurality of connectors that couple the first compartment to the second compartment, the plurality of connectors extending along a plurality of planes between the first compartment and the second compartment, such that each connector of the plurality of connectors contacts both the first compartment and the second compartment;

wherein a first connector of the plurality of connectors comprises a bore that extends through the first connector in a direction orthogonal to the first axis and the second axis and between the first compartment and the second compartment;

wherein the cover plate comprises two bent portions that extend parallel to the first axis and the second axis; and wherein the two bent portions couple to the bore between the first compartment and the second compartment.

7. The tool pouch of claim 6, wherein each connector of the plurality of connectors is spaced apart from each other in a direction parallel to the first axis.

8. The tool pouch of claim 6, wherein each of the plurality of connectors extends between the first and second compartments such that each of the plurality of connectors contacts opposing outer surfaces of the first compartment and each of the plurality of connectors contacts opposing outer surfaces of the second compartment.

9. The tool pouch of claim 1, further comprising an insert coupled to the cover plate, the insert extending into the first compartment and the second compartment, the insert comprising a fourth material having a higher melting temperature than the first and second melting temperatures.

10. The tool pouch of claim 1, wherein the first compartment and the second compartment are formed from a single integral component.

11. A cooling bit holder storage system comprising:

an apron comprising a pocket;

a drill bit having a bit temperature at a drilling tip of the drill bit; and a bit holder placed within the pocket, the bit holder comprising a first compartment longitudinally extending along a first axis, the first compartment comprising:

a first opening;

a first end located opposite the first opening along the first axis; and a first material having a first melting temperature;

the bit holder further comprising a second compartment longitudinally extending along a second axis parallel to the first axis, the second compartment comprising:

a second opening;

a second end opposite the second opening on the second axis; and a second material having a second melting temperature; and a cover plate comprising a third material having a third melting temperature that is higher than the first melting temperature and the second melting temperature;

wherein the bit temperature of the drilling tip of the drill bit is higher than the first melting temperature of the first material, is higher than the second melting temperature of the second material, and is less than the third melting temperature of the third material.

12. The cooling bit holder storage system of claim 11, wherein the first material is the same as the second material.

13. The cooling bit holder storage system of claim 11, wherein the first melting temperature is the same as the second melting temperature.

14. The cooling bit holder storage system of claim 11, further comprising an insert coupled to the cover plate, the insert extending into the first compartment and the second compartment, the insert comprising a fourth material having a higher melting temperature than the third melting temperature.

15. The cooling bit holder storage system of claim 11, wherein the first compartment and the second compartment are a single integral component.

* * * * *